US008762557B2

(12) United States Patent
Xu et al.

(10) Patent No.: US 8,762,557 B2
(45) Date of Patent: Jun. 24, 2014

(54) SIGNALING GATEWAY AND ITS SIGNALING PROCESSING METHOD

(75) Inventors: Liqun Xu, Shenzhen (CN); Dongming Fan, Shenzhen (CN); Haifang Liu, Shenzhen (CN); Rong Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 235 days.

(21) Appl. No.: 13/000,445

(22) PCT Filed: Jun. 26, 2008

(86) PCT No.: PCT/CN2008/071454
§ 371 (c)(1),
(2), (4) Date: Dec. 21, 2010

(87) PCT Pub. No.: WO2009/155748
PCT Pub. Date: Dec. 30, 2009

(65) Prior Publication Data
US 2011/0106960 A1    May 5, 2011

(51) Int. Cl.
*G06F 15/16*    (2006.01)
*H04L 29/06*    (2006.01)
*H04Q 3/00*    (2006.01)

(52) U.S. Cl.
CPC .......... *H04L 65/104* (2013.01); *H04L 65/1043* (2013.01); *H04Q 3/0025* (2013.01); *H04Q 2213/13097* (2013.01); *H04Q 2213/13176* (2013.01)
USPC ........... 709/230; 709/231; 709/232; 709/233; 709/234; 709/235; 709/236; 709/237

(58) Field of Classification Search
CPC ... H04L 65/104; H04L 65/1043; H04L 69/16; H04L 69/169; H04Q 2213/13097; H04Q 2213/13176; H04Q 3/0025
USPC ................................................ 709/230–237
See application file for complete search history.

(56) References Cited

U.S. PATENT DOCUMENTS 6,823,061 B2 *  11/2004  Prasad et al. .................. 379/230
(Continued)

FOREIGN PATENT DOCUMENTS

| CN | 1741476 A | 3/2006 |
|----|-----------|--------|
| CN | 101043477 A | 9/2007 |
| WO | 03017599 A1 | 2/2003 |

OTHER PUBLICATIONS

ITU-T Recommendation Q.714, "Signalling connection control part procedures," pp. 6-13, May 2001.*

(Continued)

*Primary Examiner* — Wing F Chan
*Assistant Examiner* — Padma Mundur
(74) *Attorney, Agent, or Firm* — MacMillan, Sobanski & Todd, LLC

(57) ABSTRACT

A signaling gateway (SG) and a method for the SG to process signaling. The method comprises: after a SG which is configured with SCCP protocol, one or more SCCP service related subsystems, and GT translation function receives a connectionless-oriented SCCP service message in MTP3 protocol, the SG determining whether the message is a local office message according to a destination signaling point code carried in the message or a signaling point code generated by translating a GT carried in the message; and if the message is a local office message, the SG forwarding the message to a corresponding SCCP service related subsystem configured in the SG according to a subsystem number carried in the message, or forwarding the message to a corresponding SCCP service related subsystem configured in a MGC; the MGC and SG having the same signaling point code and being connected in the M3UA protocol. By configuring the SG with SCCP, management subsystem as well as service related subsystems, the present invention reduces the message interaction between the SG and the MGC without increasing the signaling point codes, thus improving the message forwarding efficiency.

14 Claims, 7 Drawing Sheets

(56) References Cited

U.S. PATENT DOCUMENTS

| | | | |
|---|---|---|---|
| 7,313,129 B1* | 12/2007 | Bova et al. | 370/352 |
| 7,515,607 B2* | 4/2009 | Angermayr et al. | 370/466 |
| 2003/0108067 A1* | 6/2003 | Craig et al. | 370/522 |
| 2005/0074016 A1 | 4/2005 | Dekeyser | |
| 2006/0203987 A1* | 9/2006 | Angermayr et al. | 379/230 |

OTHER PUBLICATIONS

"The Design and Realization of Software Model for Signaling Gateway in Soft Switch" by Hao Chen, Chinese Doctoral Dissertations & Master's Theses Full-test Database(Master),Information Science and Technology, Nov. 15, 2005, No. 7 in 2005, p. 30,ISSN 1671-6779.

* cited by examiner

SIGNALING GATEWAY AND ITS SIGNALING PROCESSING METHOD

CROSS-REFERENCE TO RELATED APPLICATIONS

This application is the National Phase of International Application PCT/CN08/071454 filed Jun. 26, 2008 which designated the U.S. That International Application was published under PCT Article 21(2) on Dec. 30, 2009 as International Publication Number WO 09/155,748A1. The disclosure of that International Application is incorporated herein by reference.

TECHNICAL FIELD

The present invention relates to the communication field, and more especially, to a signaling gateway and its signaling processing method.

BACKGROUND OF THE RELATED ART

Signaling Connection Control Part (SCCP) provides the Message Transfer Part (MTP) with additional function so that it could transfer circuit-related or non-circuit-related signaling information and other information between exchange offices or between an exchange office and a special center (such as the management and maintenance center) in the telecommunication network via the No. 7 signaling network, and establish connection-oriented and connectionless-oriented services.

In No. 7 signaling network, each signaling point (SP) has a different signaling point code (point code for short). FIG. 1 is an illustration of the No. 7 signaling protocol composition. Wherein, MTP3 denotes the Message Transfer Part layer 3, and SCCP-UP is the SCCP User Part (that is, upper layer protocol).

SIGTRAN (Signaling Transport) protocol is a set of transport control protocols for transporting the PSTN (Public Switched Telephone Network) signaling on IP (Internet Protocol) network. SIGTRAN protocol stack divides into the signaling transport (mainly including IP and SCTP (Stream Control Transmission Protocol)), signaling transport adaptation and signaling application etc. M3UA (MTP3-User Adaptation layer) provides a function for conversion between the signaling point encoding and IP address to transport the No. 7 signaling protocol between the soft switch and the signaling gateway and to support transporting the MTP3 user messages, including ISUP (ISDN User Protocol), TUP (Telephone User Part) and SCCP messages, on the IP network. The M3UA has two work modes: agent and switch.

FIG. 2 is an illustration of the protocol composition of the signaling gateway of the M3UA agent. Wherein, the NIF (Nodal Interworking Function) implements the interworking between the MTP3 and M3UA.

Due to the restriction of the point code resource, the SG (Signaling Gateway) and MGC (Media Gateway Controller) usually have the same signaling point code. For example, in the networking shown in FIG. 3, the SG and MGC are configured with the M3UA protocol and share a signaling point code, and MTP3 link connection is configured between the SG and a plurality of HLRs (Home Location Register) as well as the MSCs (Mobile Services Switching Center). In this networking, the SG has to implement the agent and switch functions.

In the mode of M3UA agent, the SCCP exists in the MGC, and the SG is responsible for transferring the service messages to the SCCP in the MGC. Therefore, the SG is not configured with SCCP user (protocol); otherwise the service messages will terminate at the SCCP in the SG and will not be transferred to the MGC. Which case will certainly result in waste of bandwidth between the SG and the MGC, as well as waste of processing resource of the SG and the MGC. For example, when a message (destination is MSC1) which comes from the HLR and uses GT (Global Title) for routing is transferred through the SG, this message will be sent to the MGC through the M3UA for translation, and the translated message is sent to the SG which will in turn send it to the MSC1 for processing since the SG has no SCCP user. As indicated with 310, 320, 330 and 340 shown in FIG. 3, this message will be transferred back and forth between the SG and the MGC, and the network elements which the message passes are HLR→SG→MGC→SG→MSC1, wasting a lot of bandwidth between the SG and the MGC.

To solve this problem, the SG is assigned with a different signaling point code from the MGC in the prior art so that the SG could be configured with the SCCP protocol to implement the SG switch function. However, this solution needs to add another signaling point code, which is usually not allowed by the operators in the scenarios that the point code resource is short and the 2G devices need to be updated.

CONTENT OF THE INVENTION

The technical problem to be solved by the present invention is to provide a SG having the same signaling point code with that of a MGC and configured with the SCCP protocol, as well as a method for the SG to process signaling.

In order to solve the above problem, the present invention provides a method for a SG to process signaling, and the method comprises:

after a SG which is configured with Signaling Connection Control Part (SCCP) protocol, one or more SCCP service related subsystems, and Global Title (GT) translation function receives a connectionless-oriented SCCP service message in a Message Transfer Part layer 3 (MTP3) protocol, the SG determining whether the message is a local office message according to a destination signaling point code carried in the message or a signaling point code generated by translating a GT carried in the message; and if the message is a local office message, the SG forwarding the message to a corresponding SCCP service related subsystem configured in the SG according to a subsystem number carried in the message, or forwarding the message to a corresponding SCCP service related subsystem configured in a Media Gateway Controller (MGC) in a MTP3 User Adaptation layer (M3UA) protocol;

the MGC and SG having the same signaling point code and being connected in the M3UA protocol.

Additionally, after receiving a SCCP management message in the MTP3 protocol, the SG determines whether the message is a local office message according to a destination signaling point code carried in the message or a signaling point code generated by translating a GT carried in the message;

if the message is a local office message, the SG forwards the message to a SCCP management subsystem configured in said SG, and forwards the message to a SCCP management subsystem configured in said MGC in the M3UA protocol.

Additionally, said SG receives a connection-oriented SCCP message in the MTP3 protocol;

if the message is not a SCCP connection request message, the SG forwards the message to said MGC in the M3UA protocol;

if the message is a SCCP connection request message, then the SG determines whether the message is a local office message according to a destination signaling point code carried in the message or a signaling point code generated by translating a GT carried in the message; and if the message is a local office message, then the SG forwards the message to said MGC in the M3UA protocol.

Additionally, if said SG determines that the received SCCP message is not a local office message according to the signaling point code generated by translating the GT, the SG forwards the message out of the local office in the MTP3 protocol.

Additionally, after receiving the SCCP message sent by said MGC in the M3UA protocol, the SG directly forwards the message out of the local office in the MTP3 protocol.

The present invention also provides a signaling gateway (SG), comprising a configuration unit, a Signaling Connection Control Part (SCCP) unit, one or more SCCP service related subsystems, a Message Transfer Part layer 3 (MTP3) forwarding unit and a MTP3 User Adaptation layer (M3UA) forwarding unit; wherein:

said configuration unit is used to configure a SCCP protocol as a MTP3 protocol and a M3UA protocol and record subsystem numbers of said one or more SCCP service related subsystems configured in said SG;

said MTP3 forwarding unit is used to forward a SCCP message between said SCCP unit and an adjacent office having a different signaling point code according to the MTP3 protocol;

said M3UA forwarding unit is used to forward the SCCP message between said SCCP unit and a Media Gateway Controller (MGC) according to the M3UA protocol;

said SCCP unit has a Global Title (GT) translation function and is used to implement the SCCP protocol; after receiving a connectionless-oriented SCCP service message output by said MTP3 forwarding unit, the SCCP unit determines whether the message is a local office message according to a destination signaling point code carried in the message or a signaling point code generated by translating a GT carried in the message; if the message is a local office message, then said SCCP unit forwards the message to a corresponding SCCP service related subsystem configured in said SG according to a subsystem number carried in the message as well as a subsystem number recorded in said configuration unit, or forwards the message to said MGC in the M3UA protocol;

said MGC and SG have the same signaling point code and are connected in the M3UA protocol.

Additionally, said SCCP unit is further used to determine whether a SCCP management message output by said MTP3 forwarding unit is a local office message according to a destination signaling point code carried in the message or a signaling point code generated by translating a GT carried in the message after receiving the message; and process the message in the SCCP protocol and forward the message to said MGC through the M3UA forwarding unit if the message is a local office message.

Additionally, said SCCP unit is further used to determine whether a SCCP connection request message output by the MTP3 forwarding unit is a local office message according to a destination signaling point code carried in the message or a signaling point code generated by translating a GT carried in the message after receiving the message; if the message is a local office message, then the SCCP unit forwards the message to said MGC through said M3UA forwarding unit.

Additionally, if said SCCP unit determines that the received SCCP message is not a local office message according to a signaling point code generated by translating a GT, the SCCP unit forwards the message out of the local office through said MTP3 forwarding unit.

Additionally, said SCCP unit is further used to directly forward the SCCP message sent by the MGC out of the local office through said MTP3 forwarding unit after receiving the SCCP message through said M3UA forwarding unit.

By configuring the SCCP user (protocol), SCCP management subsystem, as well as the SCCP service related subsystem in the SG, setting different message forwarding criterions for connection-oriented SCCP message, connectionless-oriented SCCP non-management message and SCCP management message in the SG, the present invention reduces the message interaction between the SG and the MGC with no need to add the signaling point code, thus increase the message forwarding efficiency.

PREFERRED EMBODIMENTS OF THE PRESENT INVENTION

The present invention will be described in further detail in combination with the accompanying figures and the preferred embodiments.

The basic idea of the present invention is, by configuring the SCCP management subsystem (that is, the management process of the SCCP protocol), as well as the SCCP service related subsystem (that is, the SCCP upper layer protocol, also called the SCCP User Part) in the SG, setting different message forwarding criterions for connection-oriented SCCP message, connectionless-oriented SCCP non-management message and SCCP management message in the SG, the present invention reduces the message interaction between the SG and the MGC with no need to add the signaling point code, thus improving the message forwarding efficiency.

Figure 4:
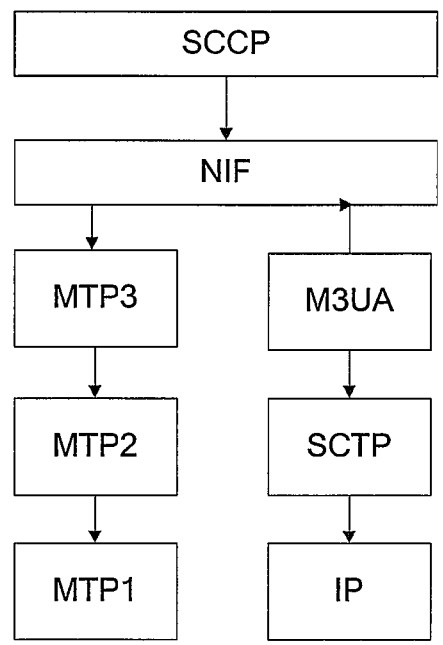
FIG. 4 is an illustration of protocol stack in the SG after adding the SCCP in accordance with an embodiment of the present invention.

FIG. 4 is an illustration of the protocol stack in the SG after adding the SCCP.

Figure 5:
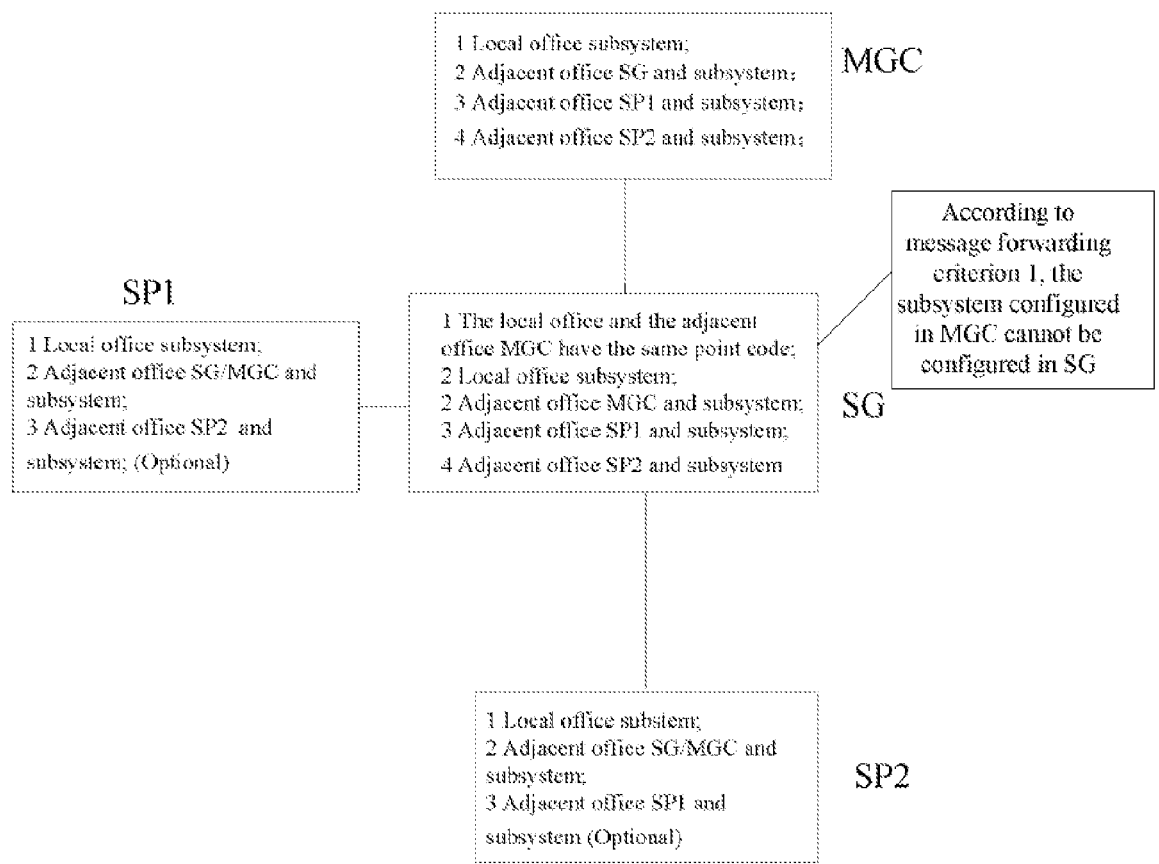
FIG. 5 is an illustration of the SG configuration in accordance with an embodiment of the present invention.

The SG and the MGC are configured with the M3UA protocol and share a signaling point code, when end office SP1 and SP2 access the signaling gateway, the networking and configuration specification is as shown in FIG. 5, and it mainly comprises the following items:

1) SG is configured in the local database with:
   SCCP user (that is, the SCCP protocol is configured as the MTP3/M3UA user part);
   subsystem numbers of a SCCP management subsystem (that is, the management process of the SCCP protocol) as well as a SCCP service related subsystem (that is, the SCCP upper layer protocol, also called the SCCP user part) of the local office;

subsystem numbers of a SCCP management subsystem as well as a SCCP service related subsystem of an adjacent office MGC;

signaling point codes of an adjacent office MGC and the local office;

subsystem numbers of a SCCP management subsystem and a SCCP service related subsystem of an adjacent office SP1; and subsystem numbers of a SCCP management subsystem and a SCCP service related subsystem of an adjacent office SP2.

With the above configuration, the SG knows whether it has the same signaling point code as that of an adjacent office MGC or not, what SCCP management subsystems are configured in the local office, what SCCP management subsystems and SCCP service related subsystems are configured in the adjacent office MGC, SP1 and SP2 respectively.

2) MGC is configured in the local database with:

SCCP user (that is, the SCCP protocol is configured as the MTP3/M3UA user part);

subsystem numbers of a SCCP management subsystem and a SCCP service related subsystem of the local office;

subsystem numbers of a SCCP management subsystem and a SCCP service related subsystem of an adjacent office SG;

subsystem numbers of a SCCP management subsystem and a SCCP service related subsystem of an adjacent office SP1;

subsystem numbers of a SCCP management subsystem and a SCCP service related subsystem of an adjacent office SP2.

3) SP1 is configured with:

SCCP user (that is, the SCCP protocol is configured as the MTP3/M3UA user part);

access to the SG through the MTP3 link;

adjacent office SG/MGC (since the SG and the MGC have the same point code, SP1 regards them as one adjacent office).

subsystem number of a SCCP service related subsystem of the local office and an adjacent office's SG/MGC;

subsystem number of a SCCP service related subsystem and an adjacent office SP2 (optional).

4) SP2 is configured similarly to SP1.

Figure 1:
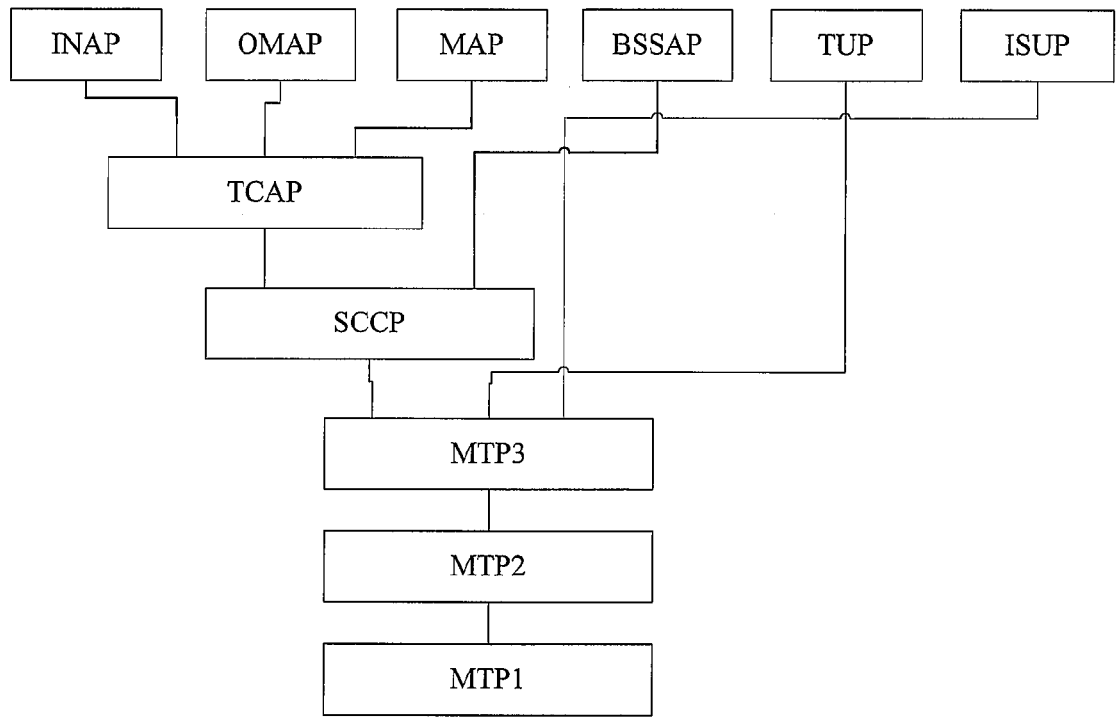
FIG. 1 is an illustration of composition of No. 7 signaling protocol.
Figure 2:
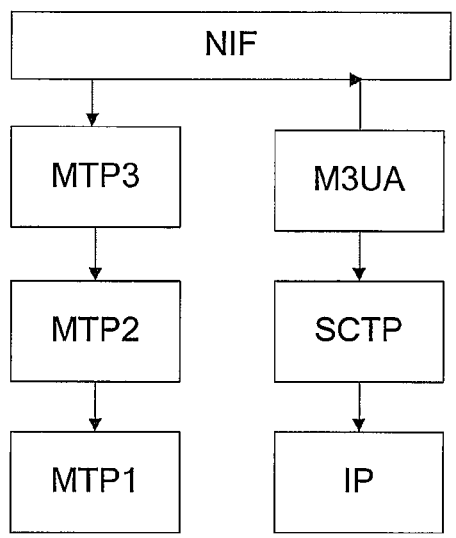
FIG. 2 is an illustration of protocol composition of the signaling gateway of the M3UA agent in the prior art.
Figure 3:
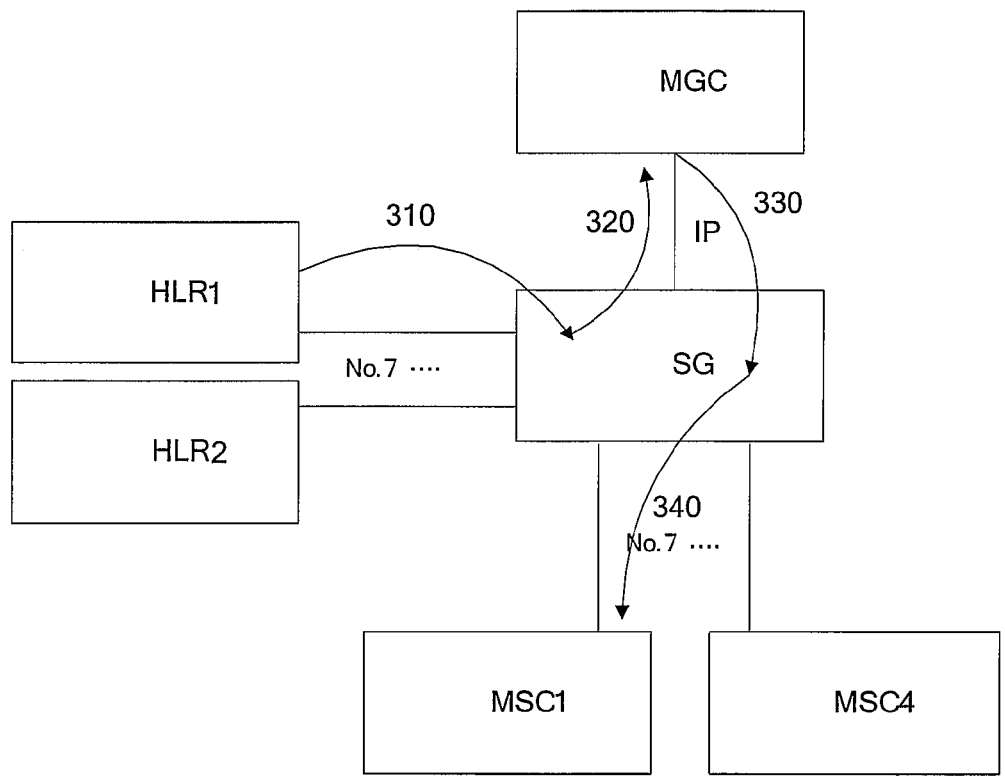
FIG. 3 is an illustration of SG networking in the prior art.

Besides of the above configurations, it also requires that the SG and MGC which have the same signaling point code are configured with different SCCP service related subsystems, and only the connectionless-oriented SCCP service related subsystem is configured in the SG (such as the MAP shown in FIG. 1).

Since the SG and the MGC have the same signaling point code, the SCCP in the SG needs to meet the following message forwarding criterions when it forwards the SCCP message to the adjacent office MGC having the same signaling code in order to avoid message forwarding errors:

criterion 1—an adjacent office with the same point code has high priority: if the adjacent office with the same point code (that is, the MGC with the same point code is configured in the database) can be matched, the SCCP in the SG forwards the SCCP message to the adjacent office with the same point code, otherwise, it reports the message to the local office's SCCP service related subsystem;

criterion 2—subsystem configuration has high priority: only if the local office (SG) is configured with an adjacent office having the same point code while not configured with a subsystem corresponding to the subsystem number carried in the service message, the SCCP message is forwarded to the adjacent office having the same point code; if the local office is configured with the subsystem corresponding the SCCP message, it should report the received SCCP message to the SCCP service related subsystem of the local office no matter whether it is configured with an adjacent office having the same point code or not; and criterion 3—all the SCCP management messages are forwarded: since the SG and the MGC need to maintain the status of their adjacent office subsystem, therefore, all SCCP management messages such as the SSP/SSA/SST (Sub-System-Prohibited/SubSystem-Allowed/SubSystem-status-Test) received by the SG are required to be forwarded to the SG's SCCP management subsystem and the MGC.

Criterion 1 applies to forwarding of the connection-oriented SCCP service message, this is because that the connection-oriented SCCP service message always is related to factors such as charging and it cannot be terminated in the SG;

The CR (Connection Request) message in the connection-oriented SCCP message carries the SSN (Subsystem Number, that is, the SCCP Subsystem Number), however, since the connection segment is generally not established in the SG, criterion 1 is applied to forwarding of the message, and since other connection-oriented SCCP messages do not carry SSN, they are also forwarded applying criterion 1.

Criterion 2 applies to forwarding of the connectionless-oriented SCCP messages, and its advantage is that the SG can process part of the SCCP messages. Since the connectionless-oriented SCCP message carries the SSN, the SG acquires whether the local office is configured with the corresponding subsystem or not according to the SSN and the configuration in the database.

Figure 6:
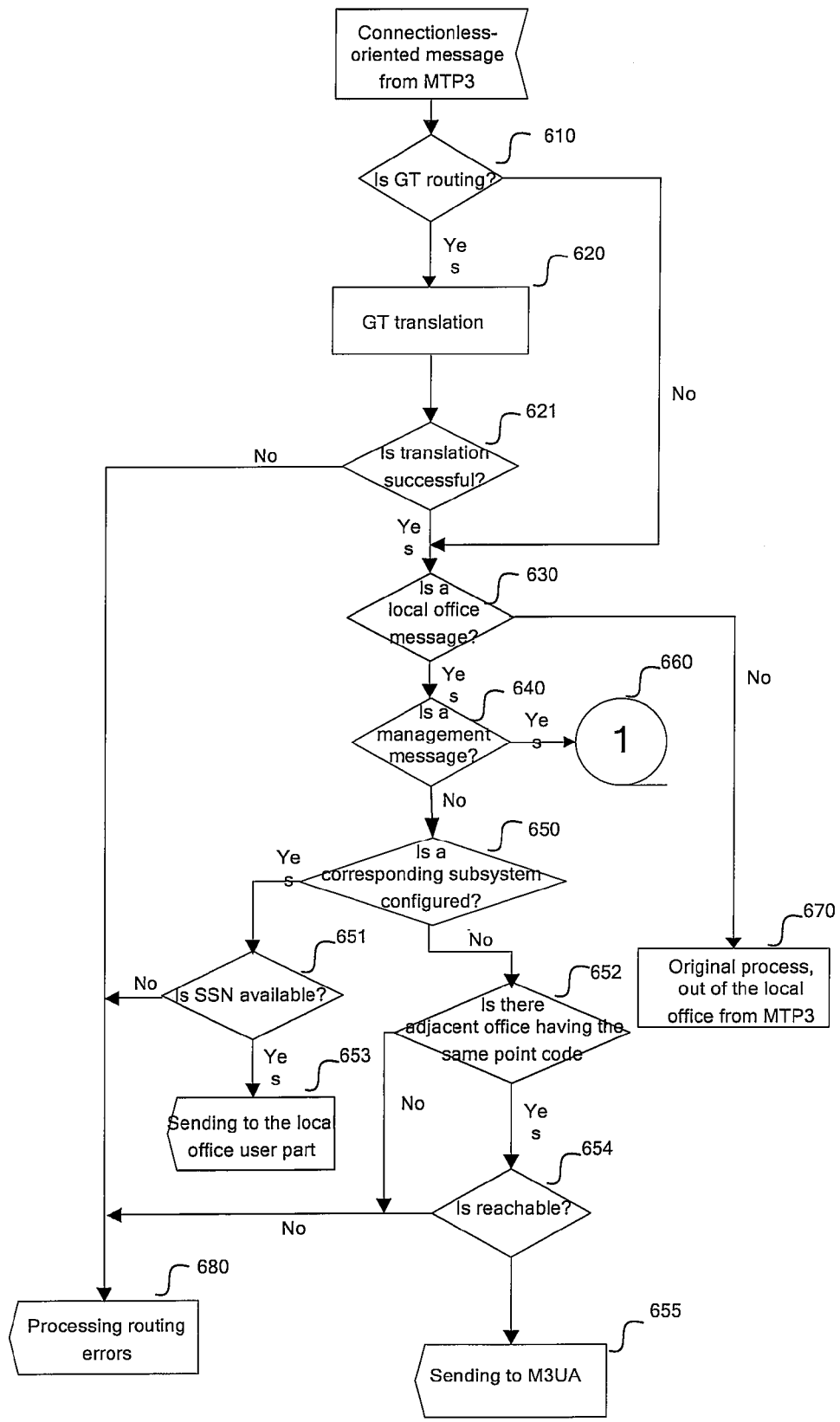
FIG. 6 is a flow chart of the SCCP in the SG processing the received connectionless-oriented SCCP message in accordance with an embodiment of the present invention.
Figure 7:
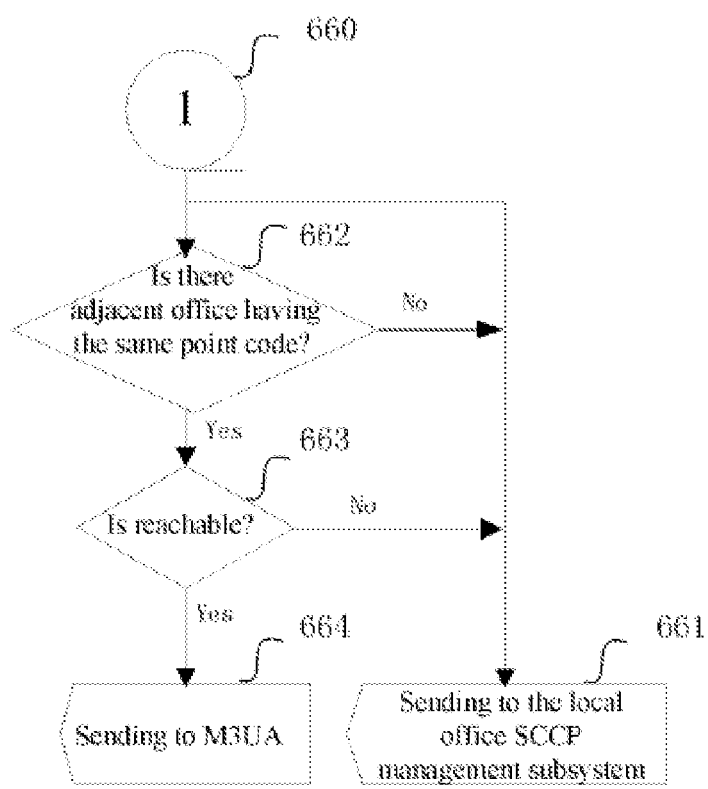
FIG. 7 is a flow chart of the SCCP in the SG processing the received SCCP management message.

FIG. 6 is a flow chart of the SCCP in the SG processing the received connectionless-oriented SCCP message, and FIG. 7 is a flow chart of the SCCP in the SG processing the received SCCP management message. As shown in FIG. 6 and FIG. 7, the method for processing the received connectionless SCCP message (including the SCCP management message and the connectionless SCCP service message) from the MTP3 comprises the following steps:

Step 610, the SCCP in the SG determines the routing way of the connectionless SCCP message: if it is GT routing (that is, the message carries the global title), proceed to step 620; if it is DPC+SSN (that is, the message carries the DPC (Destination Point Code) and the SSN), skip to step 630;

Step 620, the SCCP in the SG translates the GT carried in the message to generate the corresponding signaling point code;

Step 621, if the GT translation is successful, proceed to step 630; otherwise skip to step 680 for routing error processing, and end;

Step 630, determine whether the message is a local office message or not according to the DPC carried in the message or the signaling point code generated by translating the GT in the message: if yes, proceed to step 640; otherwise, skip to step 670;

Step 640, determine whether the message is a SCCP management message or not: if no, proceed to step 650; otherwise skip to step 660;

Step 650, determine whether the local office (SG) has been configured with the subsystem corresponding to the SSN carried in the message or not:

If the local office is configured with the corresponding subsystem, then determine that the SSN is available (that is, the corresponding subsystem is available) and send the message to the local office's SCCP service related subsystem (corresponding to the steps 651 and 653 in FIG. 6), and end;

If the local office is not configured with the corresponding subsystem, then determine whether it is configured with an adjacent office having the same point code or not (step 652), if it is and the adjacent office is reachable (step 654), send the message to the MGC through the M3UA, and end; if it is not and there is no adjacent office having the same point code, skip to step 680 for routing error processing, and end;

Step 660, the SCCP in the SG sends the SCCP management message to the local SCCP management subsystem and determines whether there is an adjacent office having the same point code or not (step 662), and if there is and it is reachable (step 663), forward the message to the adjacent office having the same point code through the M3UA (step 664), and end.

Step 670, if the message is not a local office message, the SG forwards it out of the office through the MTP3, and end;

Step 680, process the routing error, and if a message is required to be returned (that is, an error notification message is required to be sent), start a returning process and response the resource with UDTS/XUDTS/LUDTS (Unit DaTa Service/eXtended Unit DaTa Service/Long Unit DaTa Service) messages.

Figure 8:
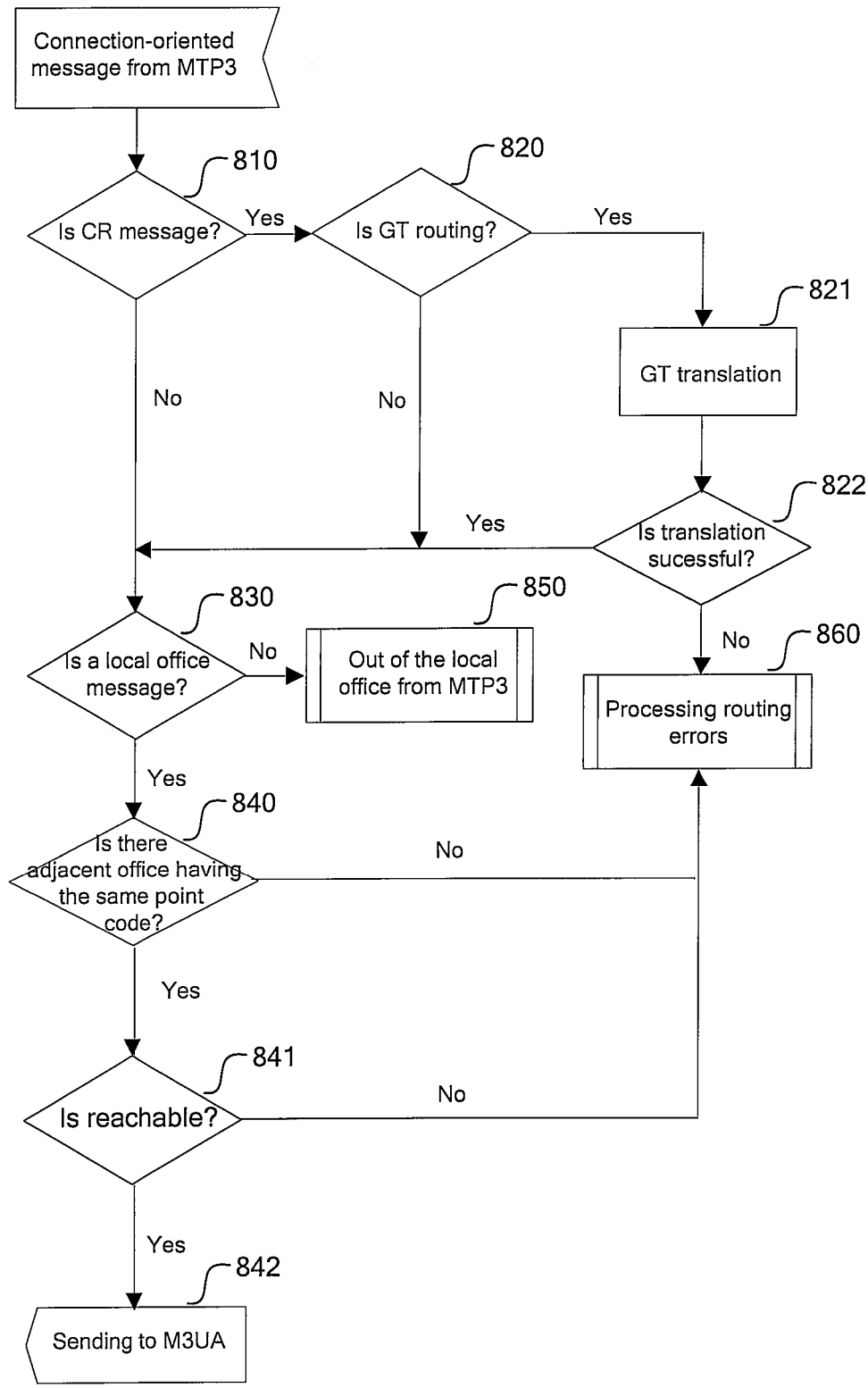
FIG. 8 is a flow chart of the SCCP in the SG processing the received connection-oriented SCCP message.

FIG. 8 is a flow chart of the SCCP in the SG processing the received connection-oriented SCCP message, and the flow of processing the connection-oriented SCCP message coming from the MTP3 comprises the following steps:

Step 810, the SCCP in the SG determines whether the message is a CR message or not, if no, skip to step 830, otherwise proceed to step 820;

Step 820, determine the routing way of the message: if it is DPC+SSN, proceed to step 830; if it is GT routing, perform GT translation (step 821), and if the GT translation is successful, proceed to step 830, otherwise skip to step 860 for error processing;

Step 830, according to the DPC carried in the message or the signaling point code generated by translating the GT, determine whether the message is a local message or not: if yes, proceed to step 840; otherwise skip to step 850;

Step 840, determine whether it is configured with an adjacent office having the same point code or not:

If no, skip to step 860 for error processing;

If yes and the adjacent office having the same point code is reachable, the SCCP in the SG does not determine whether the local office is configured with the corresponding subsystem any more, and forwards the message to the MGC through the M3UA (steps 841 and 842 in FIG. 8), and end; if the adjacent office having the same point code is not reachable, skip to step 860 for error processing;

Step 850, if this message is not a local office message, the SCCP in the SG forwards the message out of the office through the MTP3, and end;

Step 860, process routing error, and start the rejection/release process.

In addition, it should be noted that when the SG receives the SCCP response message returned from the MGC, the SCCP response message is forwarded out directly through the MTP3 rather than through the SCCP in the SG.

Figure 9:
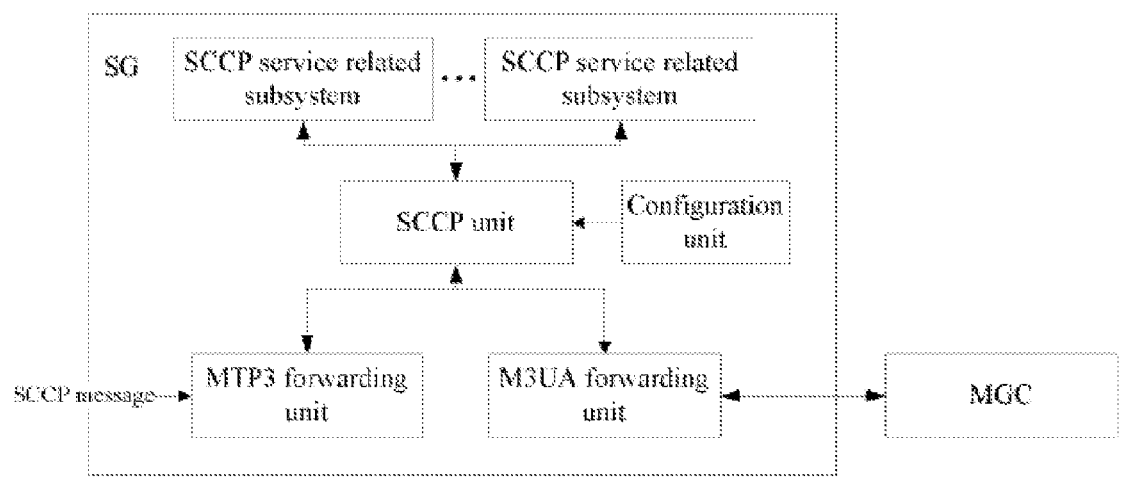
FIG. 9 is an illustration of the structure of a SG in accordance with an embodiment of the present invention.

FIG. 9 is an illustration of the structure of a SG in accordance with an embodiment of the present invention. As shown in FIG. 9, the SG comprises: a configuration unit, a SCCP unit, one or more SCCP service related subsystems, a MTP3 forwarding unit and a M3UA forwarding unit.

The configuration unit is used to configure the SG with the follows and output the configuration information:

SCCP user (that is, the SCCP protocol is configured as the MTP3/M3UA user part);

a local office SCCP management subsystem (that is, the management process of the SCCP protocol), as well as the SCCP service related subsystem (that is, the SCCP upper protocol, also called the SCCP user part);

an adjacent office MGC's SCCP management subsystem as well as the SCCP service related subsystem;

signaling point codes of an adjacent office MGC and the local office;

an adjacent office SP1's SCCP management subsystem as well as the SCCP service related subsystem;

an adjacent office SP2's SCCP management subsystem as well as the SCCP service related subsystem.

The SCCP unit is used to implement the SCCP protocol and GT translation functions, and forward the SCCP message according to the configuration information output by the configuration unit; and the SCCP messages divide into connectionless SCCP service, SCCP management message, and connection-oriented SCCP message. The method for forwarding the above message is as above.

The MTP3 forwarding unit is used to receive the SCCP message sent by the adjacent office and output it to the SCCP unit; receive the SCCP message sent by the SCCP and forward it to the adjacent office.

The M3UA forwarding unit is used to forward the SCCP message between the SG and the MGC which has the same signaling point code as that of the SG.

INDUSTRIAL APPLICABILITY

By configuring the SCCP management subsystem and the SCCP service related subsystem in the SG, setting different message forwarding criterions for connection-oriented SCCP message, connectionless-oriented SCCP non-management message, and SCCP management message in the SG, the present invention reduces the message interaction between the SG and the MGC without adding the signaling point code, thus improving the message forwarding efficiency.

What is claimed is:

1. A method for a signaling gateway (SG) to process a signaling, comprising:

configuring a Signaling Connection Control Part (SCCP) protocol, one or more SCCP service related subsystems, and Global Title (GT) translation function in the SG, and configuring a signaling point code of the SG to be the same as the signaling point code of a Media Gateway Controller (MGC), wherein the SG and the MGC are connected in a Message Transfer Part layer 3 (MTP3) User Adaptation layer (M3UA) protocol, and the MGC is configured with one or more SCCP service related subsystems;

the SG receiving a connectionless-oriented SCCP service message through the MTP3 protocol;

the SG determining whether the message is a local node message according to a destination signaling point code carried in the message or a signaling point code generated by translating a GT carried in the message; and if the message is a local node message, the SG, according to a subsystem number carried in the message, forwarding the message to a corresponding SCCP service related subsystem configured in the SG or forwarding the message to a corresponding SCCP service related subsystem configured in the MGC through the M3UA protocol.

2. A method of claim 1, further comprising:

after receiving a SCCP management message through the MTP3 protocol, the SG determining whether the message is a local node message according to a destination signaling point code carried in the message or a signaling point code generated by translating a GT carried in the message;
if the message is a local node message, the SG forwarding the message to a SCCP management subsystem configured in said SG, and forwarding the message to a SCCP management subsystem configured in said MGC through the M3UA protocol.

3. A method of claim 1, further comprising:
said SG receiving a connection-oriented SCCP message through the MTP3 protocol;
if the message is not a SCCP connection request message, the SG forwarding the message to said MGC through the M3UA protocol;
if the message is a SCCP connection request message, then the SG determining whether the message is a local node message according to a destination signaling point code carried in the message or a signaling point code generated by translating a GT carried in the message; and if the message is a local node message, then the SG forwarding the message to said MGC through the M3UA protocol.

4. A method of claim 1, further comprising:
if said SG determining that the received SCCP message is not a local node message according to the destination signaling point code carried in the message or the signaling point code generated by translating the GT, the SG forwarding the message out of the local node through the MTP3 protocol.

5. A method of claim 1, further comprising:
after receiving a SCCP message sent by said MGC through the M3UA protocol, the SG directly forwarding the message out of the local node through the MTP3 protocol.

6. A signaling gateway (SG), comprising
a Signaling Connection Control Part (SCCP) unit,
one or more SCCP service related subsystems,
a Message Transfer Part layer 3 (MTP3) forwarding unit and
a MTP3 User Adaptation layer (M3UA) forwarding unit;
wherein:
in said SG, a SCCP protocol is configured above a MTP3 protocol and a M3UA protocol and record subsystem numbers of said one or more SCCP service related subsystems configured in said SG are recorded;
a signaling point code of said SG is the same as the signaling point code of a Media Gateway Controller (MGC), the SG and the MGC are connected in the M3UA protocol, and the MGC is configured with one or more SCCP service related subsystems;
said MTP3 forwarding unit is configured to forward a SCCP message between said SCCP unit and a next-hop node having a different signaling point code according to the MTP3 protocol;
said M3UA forwarding unit is configured to forward a SCCP message between said SCCP unit and the MGC according to the M3UA protocol;
said SCCP unit has a Global Title (GT) translation function and is configured to implement the SCCP protocol; after receiving a connectionless-oriented SCCP service message output by said MTP3 forwarding unit, the SCCP unit determines whether the message is a local node message according to a destination signaling point code carried in the message or a signaling point code generated by translating a GT carried in the message; if the message is a local node message, then said SCCP unit, according to a subsystem number carried in the message as well as said subsystem numbers recorded in said SG, forwards the message to a corresponding SCCP service related subsystem configured in said SG or forwards the message to said MGC through said M3UA forwarding unit.

7. A signaling gateway of claim 6, wherein,
said SCCP unit is further configured to determine whether a SCCP management message output by said MTP3 forwarding unit is a local node message according to a destination signaling point code carried in the message or a signaling point code generated by translating a GT carried in the message after receiving the message; and if the message is a local node message, the SCCP unit processes the message according to the SCCP protocol and forwards the message to said MGC through the M3UA forwarding unit.

8. A signaling gateway of claim 6, wherein,
said SCCP unit is further configured to determine whether a SCCP connection request message output by the MTP3 forwarding unit is a local node message according to a destination signaling point code carried in the message or a signaling point code generated by translating a GT carried in the message after receiving the message; if the message is local node message, then the SCCP unit forwards the message to said MGC through said M3UA forwarding unit.

9. A signaling gateway of claim 6, wherein,
if said SCCP unit determines that the received SCCP message is not a local node message according to the destination signaling point code carried in the message or the signaling point code generated by translating the GT, the SCCP unit forwards the message out of the local node through said MTP3 forwarding unit.

10. A signaling gateway of claim 6, wherein,
said SCCP unit is further configured to directly forward a SCCP message sent by the MGC out of the local node through said MTP3 forwarding unit after receiving the SCCP message through said M3UA forwarding unit.

11. A method of claim 2, further comprising:
if said SG determining that the received SCCP message is not a local node message according to the destination signaling point code carried in the message or the signaling point code generated by translating the GT, the SG forwarding the message out of the local node through the MTP3 protocol.

12. A method of claim 3, further comprising:
if said SG determining that the received SCCP message is not a local node message according to the destination signaling point code carried in the message or the signaling point code generated by translating the GT, the SG forwarding the message out of the local node through the MTP3 protocol.

13. A signaling gateway of claim 7, wherein,
if said SCCP unit determines that the received SCCP message is not a local node message according to the destination signaling point code carried in the message or the signaling point code generated by translating the GT, the SCCP unit forwards the message out of the local node through said MTP3 forwarding unit.

14. A signaling gateway of claim 8, wherein,
if said SCCP unit determines that the received SCCP message is not a local node message according to the destination signaling point code carried in the message or the signaling point code generated by translating the GT, the SCCP unit forwards the message out of the local node through said MTP3 forwarding unit.

* * * * *

UNITED STATES PATENT AND TRADEMARK OFFICE
CERTIFICATE OF CORRECTION

PATENT NO. : 8,762,557 B2  
APPLICATION NO. : 13/000445  
DATED : June 24, 2014  
INVENTOR(S) : Liqun Xu et al.

Page 1 of 1

It is certified that error appears in the above-identified patent and that said Letters Patent is hereby corrected as shown below:

In the Claims:

Column 9, Claim 6, Line 42, delete "record".

Signed and Sealed this
Sixteenth Day of September, 2014

Michelle K. Lee
*Deputy Director of the United States Patent and Trademark Office*